(12) United States Patent
Tsuchida

(10) Patent No.: US 10,302,998 B2
(45) Date of Patent: May 28, 2019

(54) IMAGE DISPLAY DEVICE

(71) Applicant: Sharp Kabushiki Kaisha, Osaka (JP)

(72) Inventor: Kenichiroh Tsuchida, Osaka (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 19 days.

(21) Appl. No.: 15/529,212

(22) PCT Filed: Nov. 26, 2015

(86) PCT No.: PCT/JP2015/005877
§ 371 (c)(1),
(2) Date: May 24, 2017

(87) PCT Pub. No.: WO2016/088343
PCT Pub. Date: Jun. 9, 2016

(65) Prior Publication Data
US 2017/0329183 A1    Nov. 16, 2017

(30) Foreign Application Priority Data
Dec. 3, 2014   (JP) .................................. 2014-245248

(51) Int. Cl.
*G02F 1/1335*   (2006.01)
*G02F 1/13357*  (2006.01)

(52) U.S. Cl.
CPC ...... *G02F 1/133606* (2013.01); *G02F 1/1336* (2013.01); *G02F 1/133608* (2013.01); *G02F 2202/28* (2013.01)

(58) Field of Classification Search
CPC ......... G02F 1/133606; G02F 1/133608; G02F 1/1336; G02F 2202/28
USPC ....................................................... 362/97.2
See application file for complete search history.

(56) References Cited

U.S. PATENT DOCUMENTS

2009/0322983 A1   12/2009   Hashino
2014/0028951 A1   1/2014    Watanabe

FOREIGN PATENT DOCUMENTS

| JP | 2007-280620 A | 10/2007 |
| JP | 2009-301912 A | 12/2009 |
| JP | 2014-026173 A | 2/2014  |

*Primary Examiner* — Elmito Breval
*Assistant Examiner* — Meghan K Ulanday
(74) *Attorney, Agent, or Firm* — ScienBiziP, P.C.

(57) ABSTRACT

An image display device includes: an image display unit; a light source unit illuminating the image display unit with light; and a bonding unit bonding the image display unit and the light source unit to each other, the bonding unit having adhesive properties, attaching the image display unit to the light source unit, and including a transmissive section that transmits the light emitted from the light source unit to the image display unit, and a peripheral section disposed on outer edges of the transmissive section that does not transmit the light emitted from the light source unit.

3 Claims, 15 Drawing Sheets

IMAGE DISPLAY DEVICE

TECHNICAL FIELD

The present invention relates to an image display device, and particularly relates to an image display device in which an image display unit is attached to a light source unit.

BACKGROUND ART

Liquid crystal display devices have been used in all types of devices in recent years, such as in mobile phones. The display surface of the liquid crystal display device has an image display area and a non-image display area (frame). Advancements in technology have led to large image display areas while narrowing the non-image display areas. As a result, compared to the total area of the display screen, the proportion of the image display area to the non-image display area has greatly increased. Furthermore, there is demand to further widen the image display area while maintaining the size of the liquid crystal display device itself, but to address this demand it is necessary to narrow the non-image display area.

A liquid crystal display device is an image display device in which liquid crystal is sealed between two glass substrates, and the application of voltage changes the orientation of the liquid crystal molecules, thereby increasing or decreasing the transmittance of light in order to display an image. The liquid crystal panel forming a portion of the liquid crystal display device does not emit light on its own, and thus requires an external light source. Therefore, in the liquid crystal display device, a light source referred to as the backlight is disposed facing the rear surface of the liquid crystal panel. The backlight emits light from the rear surface of the liquid crystal panel. This type of liquid crystal display device is referred to as a transmissive liquid crystal display device or a transflective liquid crystal display device.

The structure of a conventional liquid crystal display device A will be explained with reference to FIG. 1. The liquid crystal display device A includes a liquid crystal panel 100 and a backlight unit 200.

The liquid crystal panel 100 has a front polarizing plate 101 disposed on the display surface of the panel and a rear polarizing plate 106 disposed on the rear surface of the panel. A color filter substrate 102, liquid crystal layer 104, and array substrate 105 are layered between the front polarizing plate 101 and rear polarizing plate 106. The outer edges of the color filter substrate 102 and array substrate 105 are attached together via a sealing member 103. Liquid crystal is sealed into the space created by the sealing member, thereby forming the liquid crystal layer 104. A light-blocking layer 102a is formed on the outer edges of the color filter substrate 102 so as to make the sealing member 103 etc. imperceptible to the viewer.

An image display area 100a is formed in the center of the display surface of the liquid crystal display device A. Furthermore, a non-image display area 100b is formed around the image display area 100a. The light-blocking layer 102a is formed in a position that overlaps the non-image display area 100b.

The backlight unit 200 is bonded facing the rear surface (rear polarizing plate 106) of the liquid crystal panel 100 having the above-mentioned configuration. The liquid crystal panel 100 and backlight unit 200 each have the outer edges thereof attached to each other by rim tape (double-sided tape) 300. Light L emitted from the backlight unit 200 enters from the rear polarizing plate 106 and passes through the array substrate 105, liquid crystal layer 104, color filter substrate 102, and front polarizing plate 101 to reach the eyes of the viewer.

The light L emitted from the backlight unit 200 also passes through and escapes from the bonding surface between the liquid crystal panel 100 and backlight unit 200. In order to prevent light leakage from this bonding surface, the rim tape 300, which is colored black, is disposed on the outer edges of the bonding surface to block the light L. In other words, in addition to attaching the liquid crystal panel 100 and the backlight unit 200 together, the rim tape 300 also functions to block the light L emitted from the backlight unit 200.

If the rim tape 300 is positioned inside the image display area 100a, the rim tape 300 will appear as a shadow in the image display area 100a, and regular images will be unable to be displayed. This is due to the rim tape 300 being colored black, and thus the light L from the backlight unit 200 being blocked.

To prevent this, it is necessary to dispose the rim tape 300 so that the tape is positioned inside the non-image display area 100b.

RELATED ART DOCUMENT

Patent Document

Patent Document 1: Japanese Patent Application Laid-Open Publication No. 2009-301912

SUMMARY OF THE INVENTION

Problems to be Solved by the Invention

The configuration of the conventional liquid crystal display device A described above has the following problems. The problems will be explained with reference to FIGS. 2 to 4.

As already described above, in order to widen the image display area 100a while keeping the size of the liquid crystal display device A itself the same, it is necessary to narrow the non-image display area 100b. As shown in FIG. 2, if the non-image display area 100b is narrowed to a width that is less than that of the rim tape 300, the shadow of the rim tape 300 will appear in the image display area 100a as described above (namely, the line of sight S will reach the rim tape 300), and regular images will no longer be able to be displayed.

Meanwhile, as shown in FIG. 3, if the rim tape 300 is narrowed to a width that is less than that of the non-image display area 100b, the shadow of the rim tape 300 will no longer be perceptible (in other words, the line of sight S will not overlap the rim tape 300). Narrowing the rim tape 300, however, means narrowing the attachment area of the backlight unit 200 and liquid crystal display panel 100, which is problematic due to lowering the adhesive strength of both. This problem becomes increasingly marked as the non-image display area 100b is narrowed further.

Patent Document 1 (paragraph [0019], FIG. 2) discloses using a rim sheet 7 (double-sided tape) having light blocking and reflecting functions to bond a liquid crystal panel 2 and backlight unit 1 together. The invention of Patent Document 1 makes it possible to block light from the backlight 1 and prevent leakage to outside due to the existence of the rim sheet 7.

The invention of patent Document 1 has the rim sheet 7 disposed on a light-blocking frame 4, and a portion of the liquid crystal panel 2 and a portion of the light-blocking frame 4 are attached together. Due to this, in the invention of Patent Document 1, if the rim sheet 7 is narrowed in order to make the light-blocking frame 4 smaller, the attachment area becomes narrower, and there is a drop in reliability with respect to the durability of the attachment surface.

Furthermore, in Patent Document 1, there is no mention of narrowing the non-image display area in order to prevent the drop in reliability with respect to the durability of the attachment surface.

In addition, as shown in FIG. 4, the rim tape 300 has a base material section 300a as the base material, and an adhesive section 300b, which is the portion where the adhesive material is layered on the base material section 300a. In the related art document, light-blocking properties are imparted by coloring the base material section 300a black, or the like. However, if the same is not done for the adhesive section 300b, light L will leak from the adhesive section 300b.

The present invention was made in view of the problems described above and aims at providing an image display device having an image display unit and light source unit whereby, even if the non-image display area is narrowed, the adhesive strength when attaching the image display unit and the light source unit together is enhanced, while simultaneously preventing light leakage from the bonding surface of the image display unit and the light source unit.

Means for Solving the Problems

To solve the above-mentioned problems, an image display device of the present invention includes: an image display unit; a light source unit illuminating the image display unit with light; and a bonding unit bonding the image display unit and the light source unit to each other, the bonding unit having adhesive properties, attaching the image display unit to the light source unit, and including a transmissive section that transmits the light emitted from the light source unit to the image display unit, and a peripheral section disposed on outer edges of the transmissive section that does not transmit the light emitted from the light source unit.

Effects of the Invention

An image display device of the present invention makes it possible, even if the non-image display area is narrowed, to prevent light leakage from the bonding surface of the image display unit and the light source unit, while enhancing the adhesive strength between the image display unit and the light source unit.

DETAILED DESCRIPTION OF EMBODIMENTS

Embodiments 1 to 4 of the present invention will be described below with reference to the appended drawings. A liquid crystal display device of an embodiment of the present invention will be described, but the embodiment is not limited to a liquid crystal display device. The configuration of the present invention may be applied to any image display device that adopts a configuration in which a light source unit is disposed on the rear surface of an image display unit.

Embodiment 1

Figure 1:
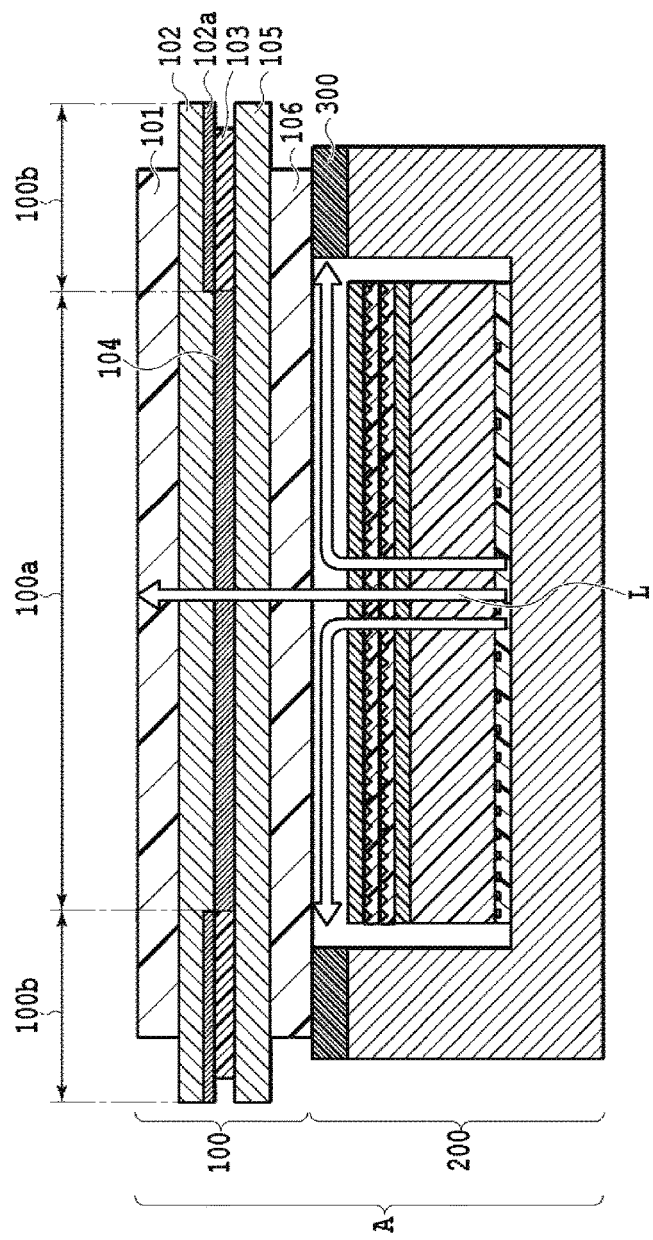
FIG. 1 is a cross-sectional view of an example of the structure of a conventional liquid crystal display device.
Figure 2:
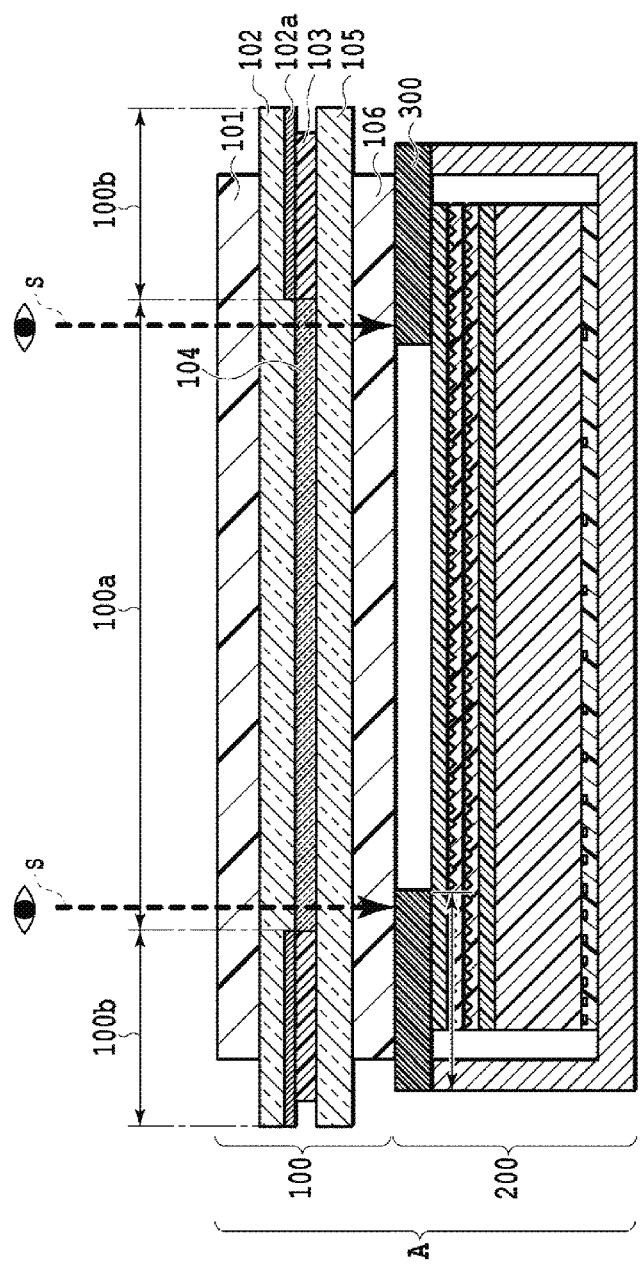
FIG. 2 is a cross-sectional view of another example of the structure of a conventional liquid crystal display device.
Figure 3:
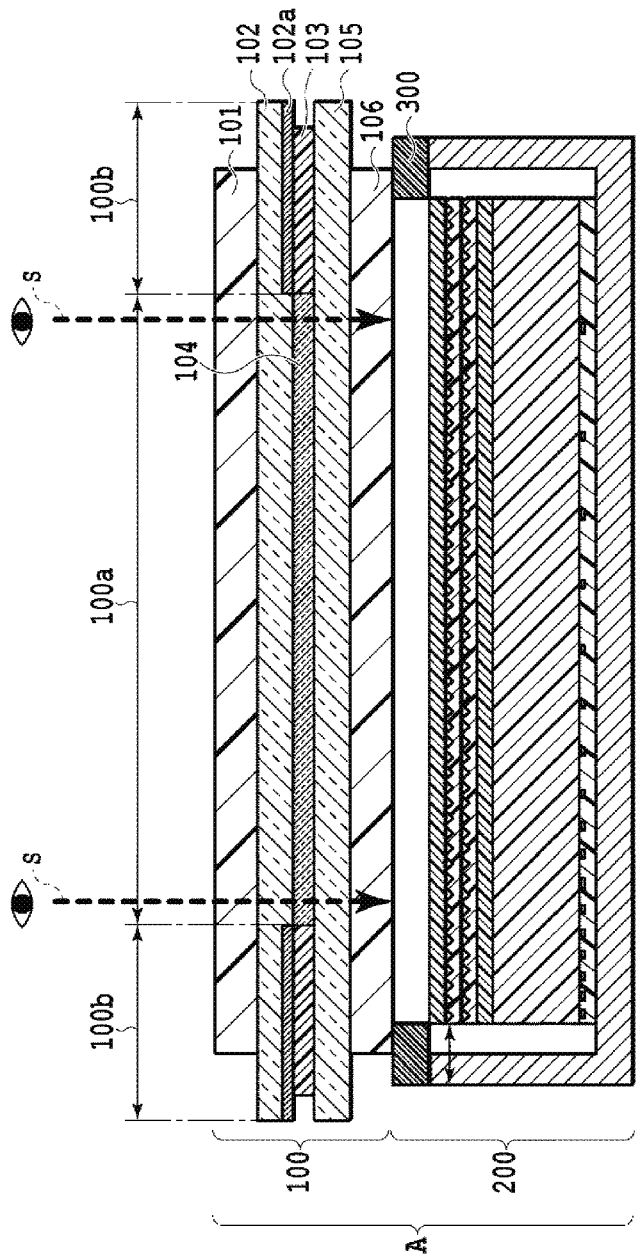
FIG. 3 is a cross-sectional view of yet another example of the structure of a conventional liquid crystal display device.
Figure 4:
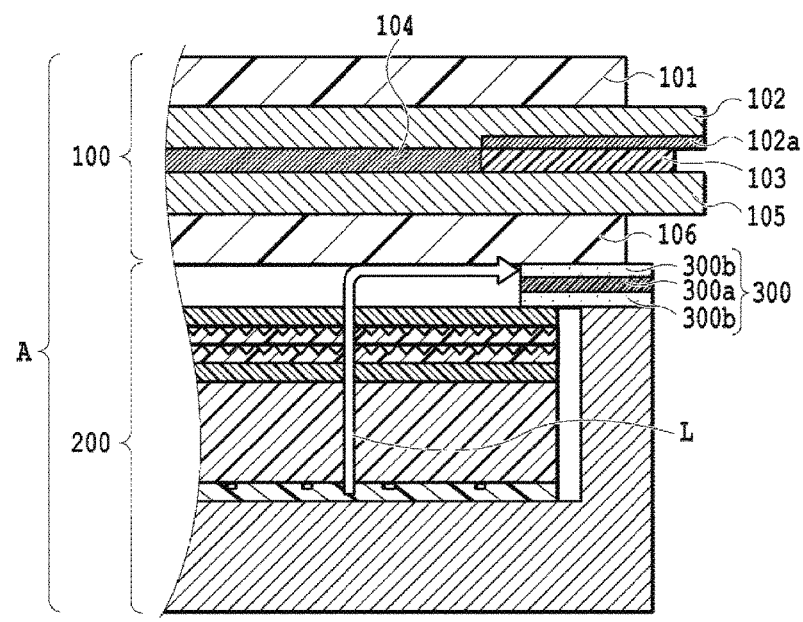
FIG. 4 is a cross-sectional view of yet another example of the structure of a conventional liquid crystal display device.
Figure 5:
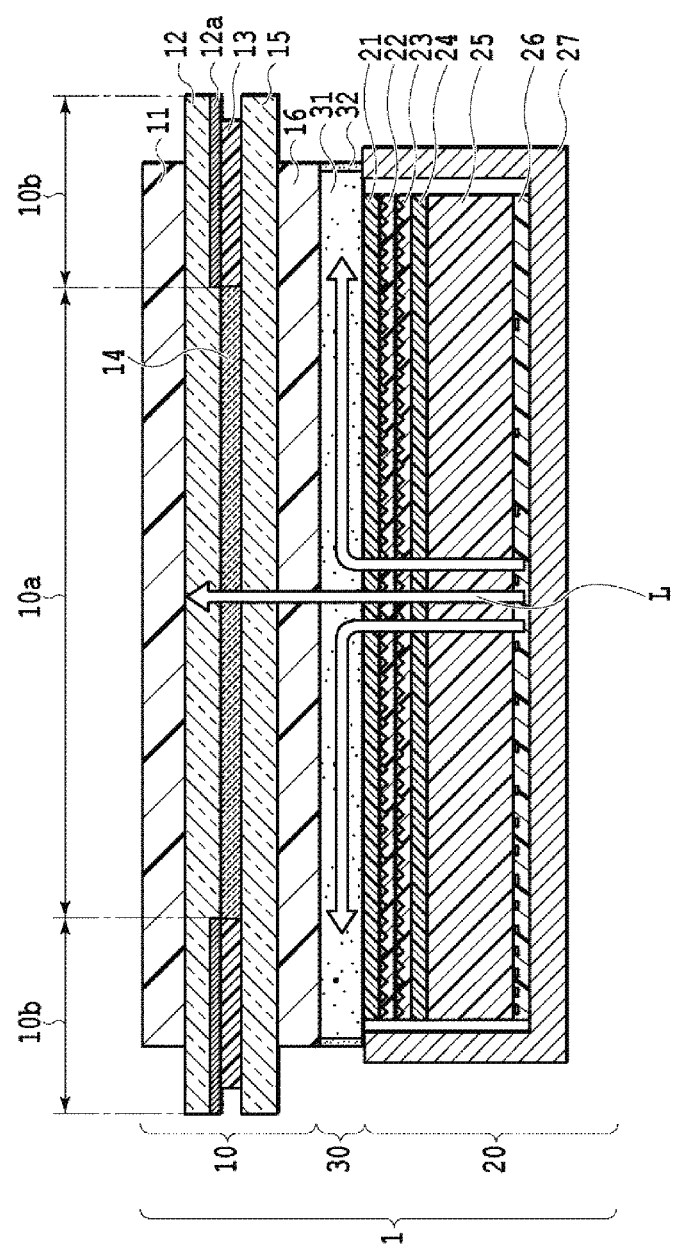
FIG. 5 is a cross-sectional view of an example of a configuration of an image display device according to Embodiment 1 of the present invention.

FIG. 5 is a cross-sectional view of an example of a configuration of an image display device according to Embodiment 1 of the present invention. The image display device 1 includes an image display unit 10, light source unit 20, and bonding unit 30. The image display unit 10 and the light source unit 20 are bonded together via the bonding unit 30. The light source unit 20 is disposed on the rear surface of the image display unit 10. The light L emitted from the light source unit 20 passes through the bonding unit 30 and is emitted to the image display unit 10.

The image display unit 10 is a display panel such as a liquid crystal panel. The image display unit 10 displays an image by applying voltage to pixel electrodes arranged in a matrix pattern in order to control the blocking or transmission of light L emitted from the light source unit 20.

The light source unit 20 generates light for illuminating the image display unit 10. Light-emitting diodes, discharge fluorescent tubes (cold cathode fluorescent tubes, hot cathode fluorescent tubes, xenon fluorescent tubes, etc.), electroluminescent (EL) elements, and the like can be used as the light-emitting source.

The bonding unit 30 is an optical adhesive (optical clear adhesive [OCA]) that attaches the light-entering surface of the image display unit 10 to the light-exiting surface of the light source unit 20. OCA refers to a transparent double-sided adhesive tape, a transparent adhesive film, or the like without a base material. In other words, the bonding unit 30 can also be said to be an adhesive film that attaches the image display unit 10 to the light source unit 20.

The bonding unit 30 includes a transmissive section 31 where the light L emitted from the light source unit 20 passes through, and a light-blocking section 32 that blocks the light L emitted from the light source unit 20. The transmissive section 31 is disposed in the center of the bonding unit 30, and the light-blocking section 32 is disposed on the outer edges of the bonding unit 30; details will be given later. The light-entering surface of the image display unit 10 and the light-exiting surface of the light source unit 20 are bonded (attached) facing each other across the bonding unit 30. The light-blocking section 32 is one form one of the peripheral section of the bonding unit 30.

The image display unit 10 includes a front polarizing plate 11, color filter substrate 12, sealing member 13, liquid crystal layer 14, array substrate 15, and rear polarizing plate 16. The rear polarizing plate 16 serves as a light-receiving surface for the light L emitted from the light source unit 20.

The light L emitted from the light source unit 20 passes through the rear polarizing plate 16, array substrate 15, liquid crystal layer 14, color filter substrate 12, and front polarizing plate 11 in this order to reach the eyes of the viewer of the image display device 1.

The front polarizing plate 11 is disposed on the display surface of the image display unit 10 and transmits polarized light of a specific direction among the light L that has passed through the liquid crystal layer 14.

The color filter substrate 12 is a glass substrate or the like with an array of micro-color filters that allow red (R), green (G), or blue (B) light to pass, for example. The color filter substrate 12 colors the light L that has passed through the liquid crystal layer 14. A light-blocking layer 12a formed by sputter deposition of a metal such as chromium is formed on the outer edges of the color filter substrate 12. The color filter substrate 12 is arranged facing the light-entering surface of the front polarizing plate 11.

The sealing member 13 is arranged in a frame shape and attaches the color filter substrate 12 to the array substrate 15. Liquid crystal is sealed into the space created by the sealing member 13, thereby forming the liquid crystal layer 14.

The array substrate 15 is a glass substrate or the like with an array of thin film transistor (TFT) devices, pixel electrodes, etc. in a matrix pattern. The array substrate 15 voltage drives the liquid crystal layer 14 between the array substrate and the color filter substrate 12.

The rear polarizing plate 16 is arranged facing the light-entering surface of the array substrate 15 and transmits polarized light of a certain direction among the light L emitted from the light source unit 20.

An image display area 10a is formed in the center of the display surface of the image display unit 10. Images are displayed in this area by voltage driving the liquid crystal layer 14 so as to control the blocking or transmission of the light L emitted from the light source unit 20. Meanwhile, a non-image display area 10b is formed around the image display area 10a. The light-blocking layer 12a is formed inside the non-image display area 10b.

The light source unit 20 includes a top diffusion sheet 21, top resist sheet 22, bottom resist sheet 23, bottom diffusion sheet 24, light guide plate 25, reflective sheet 26, and case 27. The top diffusion sheet 21 serves as a light-exiting surface for the light L emitted from the light source unit 20. The top diffusion sheet 21, top resist sheet 22, bottom resist sheet 23, bottom diffusion sheet 24, light guide plate 25, and reflective sheet 26 are layered on one another and stored in the case 27.

The light guide plate 25 reflects and propagates the light from the light source (not shown) to diffuse the light. The diffused light is emitted from the front surface of the light guide plate 25.

The reflective sheet 26 faces the rear surface of the light guide plate 25 and causes light that has been emitted from the rear surface of the light guide plate 25 to re-enter the light guide plate 25.

The top diffusion sheet 21 and bottom diffusion sheet 24 further diffuse light that was unable to be made uniform by the diffusion pattern of the light guide plate 25.

The top resist sheet 22 and bottom resist sheet 23 focus light from the light guide plate 25 and emit the light to the image display unit 10 via the bonding unit 30.

The light L emitted from the light source unit 20 passes through the transmissive section 31 of the bonding unit 30 and enters the rear polarizing plate 16. A portion of the light L emitted from the light source unit 20 is blocked by the light-blocking section 32 of the bonding unit 30.

The configurations of the image display unit 10 and light source unit 20 described above are merely illustrative and are not limited to these configurations.

Figure 6:
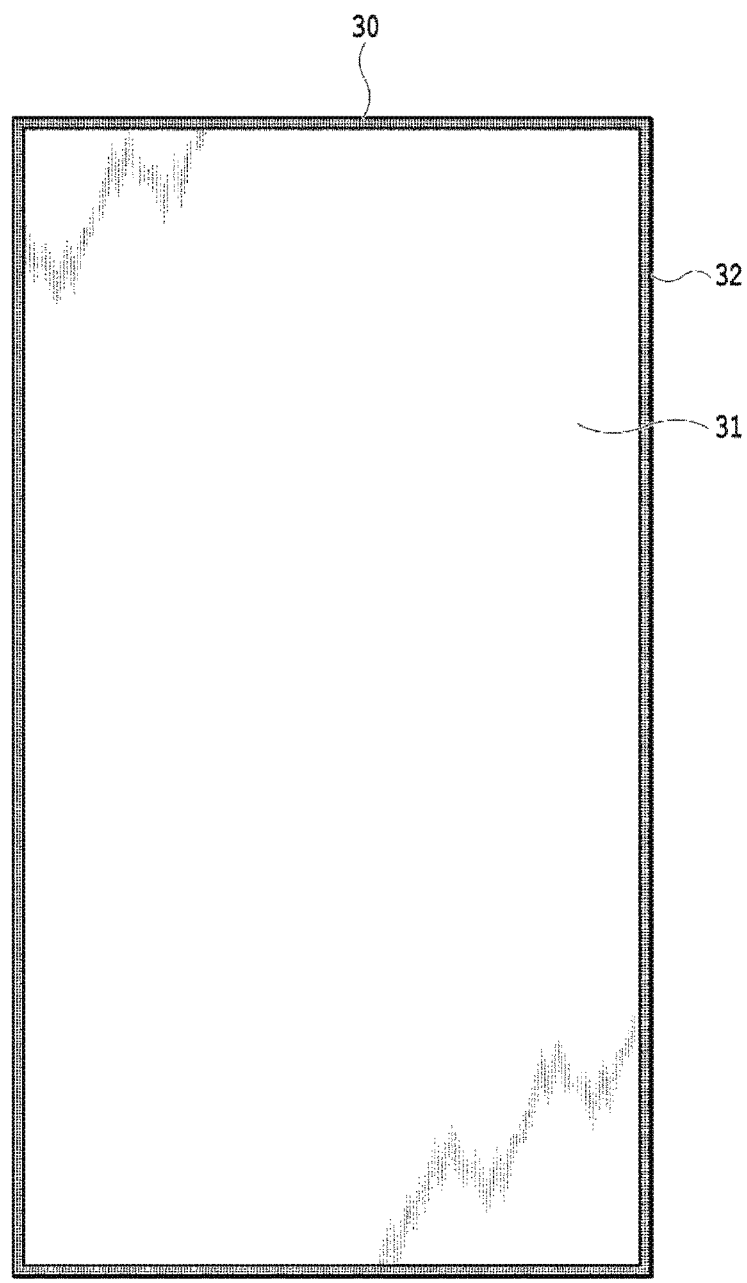
FIG. 6 is a view of an example of a detailed configuration of a bonding unit according to Embodiment 1 of the present invention.

Next, a detailed example of the bonding unit 30 will be explained with reference to FIG. 6. As described above, the bonding unit 30 includes the transmissive section 31 and the light-blocking section 32.

The transmissive section 31 allows light emitted from the light source unit 20 to pass through the image display unit 10. The light-blocking section 32 is disposed on the outer edges of the transmissive section 31 and blocks light emitted from the side faces of the bonding unit 30 among the light emitted from the light source unit 20. When the bonding unit 30 is viewed from the display surface, the light-blocking section 32 is on the four sides around the transmissive section 31. The light-blocking section 32 can also be said to be a light-blocking film that covers all side faces of the sheet-like transmissive section 31. The transmissive section 31 and light-blocking section 32 each have adhesive properties and function to attach the image display unit 10 and light source unit 20 together.

The bonding unit 30 is formed by layering the OCA and then processing the OCA into a sheet shape. The OCA is an acrylic- or urethane-based colorless transparent adhesive material. The transmittance of the OCA is preferably at least 95%.

The outer edges of the bonding unit 30 are colored black, and the colored portions form the light-blocking section 32. The width dimensions of the colored portions are assumed to be 0.02 mm, but may be adjusted via microfabrication techniques and/or by adjusting the light-blocking rate. Furthermore, the color of the light-blocking section 32 is not limited to black and may be replaced by a color that blocks light such as gray, for example. The coloring method is assumed to color the area of the light-blocking section 32 after the OCA is processed into a sheet-like shape.

The areas of the bonding unit 30 other than the light-blocking section 32 form the transmissive section 31, which allows light emitted from the light source unit 20 to pass.

Next, an example of the image display unit 10 and light source unit 20 being attached together via the bonding unit 30 will be described with reference to FIG. 7.

The light-entering surface (rear polarizing plate 16) of the image display unit 10 and the light-exiting surface (top diffusion sheet 21) of the light source unit 20 are attached facing each other via the bonding unit 30. As shown in FIG. 7, the light-exiting surface of the light source unit 20 and the opposing surface of the bonding unit 30 are attached to each other across the entire surfaces thereof via the adhesive strength of the transmissive section 31 and the light-blocking section 32. Moreover, the light-entering surface of the image display unit 10 and the opposing surface of the bonding unit 30 are attached to each other across the entire surfaces thereof via the adhesive strength of the transmissive section 31 and the light-blocking section 32.

The transmissive section 31 is disposed such that the image display area 10a is positioned in front relative to the display surface of the image display device 1. Furthermore, the light-blocking section 32 is disposed relative to the display surface of the image display device 1 so as to overlap the non-image display area 10b. The width of the light-blocking section 32 is less than or equal to the width of the non-image display area 10b. This configuration allows the light-blocking section 32 to be imperceptible to the viewer.

Hereinafter, the width of the light-blocking section 32 means the width parallel to the display surface of the image display device 1 from the edge of the light-blocking section 32 toward the center direction of the image display device 1. Furthermore, the width of the non-image display area 10b means the width parallel to the display surface of the image display device 1 from the edge of the display surface toward the center direction of the image display device 1.

Figure 8:
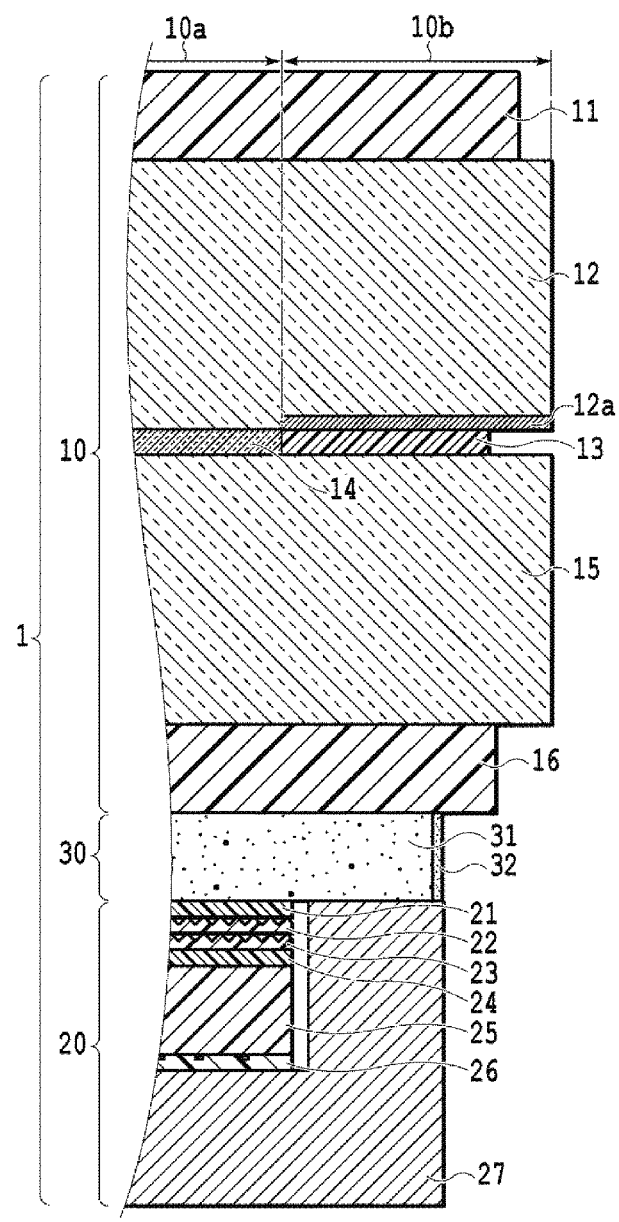
FIG. 8 is a cross-sectional view of an example in which a liquid crystal display unit and a light source unit have been attached together via a bonding unit in Embodiment 1 of the present invention.

In FIG. 8, an example is shown in which the width dimension of the light-blocking section 32 is 0.02 mm, the width dimension of the non-image display area 10b is 0.6 mm, and the image display unit 10 and light source unit 20 are attached together via the bonding unit 30 under these width dimensions. As shown in FIG. 8, the width of the light-blocking section 32 is very narrow at 0.02 mm. If this width dimension of the light-blocking section 32 were applied to the rim tape that was shown as the conventional technology, the width of the rim tape would be 0.02 mm and the adhesive strength between the image display unit 10 and light source unit 20 would be very low.

In the present invention, the image display unit 10 and the light source unit 20 are attached together via the transmissive section 31 and the light-blocking section 32; thus, even if the width of the light-blocking section 32 is reduced, it is possible to maintain sufficient adhesive strength between the image display unit 10 and the light source unit 20. In other words, as long as the light-blocking section 32 overlaps the non-image display area 10b, it is possible for the width dimension of the non-image display area 10b to be very narrow.

As described above, the image display unit 10 and the light source unit 20 are attached to each other. In the conventional technology, providing the area to ensure adhesive strength constrained the ability to narrow the width of the non-image display area.

As compared to the description above, the image display device of the present invention has the image display unit 10 and the light source unit 20 attached together across the entire surfaces thereof via the bonding unit 30; therefore, it is possible to enhance the adhesive strength between the image display unit 10 and the light source unit 20 more than in the conventional configuration that used rim tape.

Moreover, because the image display unit 10 and light source unit 20 are attached together via the transmissive section 31 and light-blocking section 32, it is possible to decrease the width of the non-image display area 10b without requiring the area for ensuring adhesive strength on the outer edges between the image display unit 10 and light source unit 20.

In addition, attaching the light-blocking section 32, which itself has adhesive properties, to the rear polarizing plate 16, the top diffusion sheet 21, or the case 27 allows all of the side faces of the transmissive section 31 to be covered by the light-blocking section 32. Accordingly, it is possible to prevent light leaking from the bonding surface of the light-blocking section 32 and rear polarizing plate 16 and the bonding surface of the light-blocking section 32 and the top diffusion sheet 23 or case 27.

Next, an applied example of Embodiment 1 of the present invention will be described with reference to FIGS. 9A and 9B. An image display device, such as a conventional liquid crystal display device, has a frame called a bezel disposed around (to the left and right of) a display panel, and a driver circuit is stored inside the bezel. This structure is limiting in that the display panel cannot be made into any shape other than rectangular.

Figure 9A:
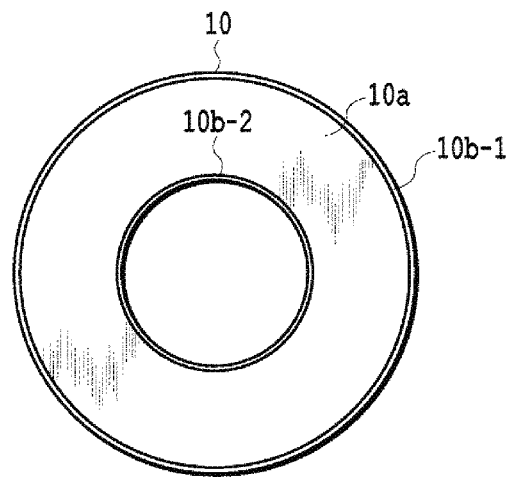
FIG. 9A is a cross-sectional view of another example in which a liquid crystal display unit and a light source unit have been attached together via a bonding unit in Embodiment 1 of the present invention.

In comparison, dividing the driver circuit into small portions and arranging these portions in a dispersed manner throughout the inside of the display panel makes it possible to have an image display device of any shape, such as a ring shape, as shown in FIG. 9A.

In an image display unit 10 having a ring shape, such as that shown in FIG. 9A, non-image display areas 10b-1 and 10b-2 are each formed on both the outer periphery and inner periphery of the ring. In other words, the non-image display area (frame) is greatly increased as compared to a rectangular image display device.

In order to widen the image display area 10a for this shape, it is necessary to reduce the width of both non-image display areas 10b-1 and 10b-2. However, if adopting a configuration that uses rim tape, the same issues with adhesive strength make it difficult to narrow the non-image display areas 10b-1 and 10b-2.

Figure 9B:
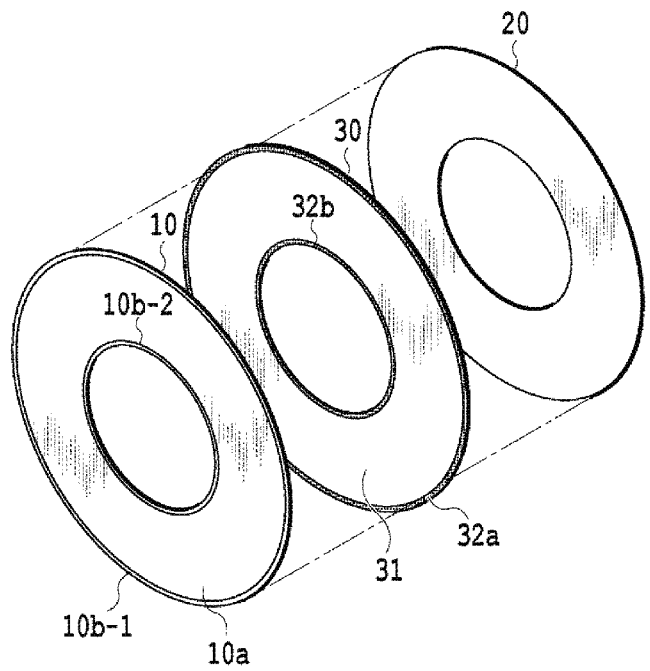
FIG. 9B is a cross-sectional view of another example in which a liquid crystal display unit and a light source unit have been attached together via a bonding unit in Embodiment 1 of the present invention.

In comparison to above, if the configuration of the present invention were to adopt a ring shape, the configuration would be that shown in FIG. 9B. The light-blocking sections 32a and 32b are each formed on the bonding unit 30 that has been processed into a ring shape by coloring both the outer periphery and inner periphery black.

The image display unit 10 and light source unit 20 are attached to each other across the entire surfaces thereof; thus, even if the widths of the light-blocking sections 32a and 32b are reduced, it is possible to maintain sufficient adhesive strength. Accordingly, it is possible to reduce the widths of the non-image display areas 10b-1 and 10b-2. Therefore, the configuration shown in FIG. 9B can have a greater area ratio between the image display area 10a and non-image display area 10b than in the conventional technology.

In Embodiment 1, an example was shown in which the light-blocking section 32 was colored with a color that has light-blocking properties, but the light-blocking section is not limited to such a configuration. The light-blocking section 32 may be constituted by an optical sheet having light-blocking properties such as a black acrylic-based optical sheet of a different material from the transmissive section 31, for example. In such a case, the optical sheet is attached to the end face (side face) of the transmissive section 31.

The width dimension of the optical sheet described above if this configuration is adopted is assumed to be 0.5 mm but may be adjusted in consideration of cutting and/or adhesive technology. Furthermore, the light-blocking rate of the optical sheet is preferably at least 95%.

Moreover, the light-blocking section 32 may be formed by coloring the end face of the transmissive section 31 with an ink having light-blocking properties such as a black or gray ink. If adopting a configuration that is colored with this ink and that uses the optical sheet described above, the light-blocking section 32 need not have adhesive properties, but rather the image display unit 10 and light source unit 20 may be attached together by only the transmissive section 31. Even with this configuration, the majority of the bonding unit 30 is formed by the transmissive section 31, and thus it is possible to sufficiently maintain the adhesive strength between the image display unit 10 and the light source unit 20.

Embodiment 2

Figure 10:
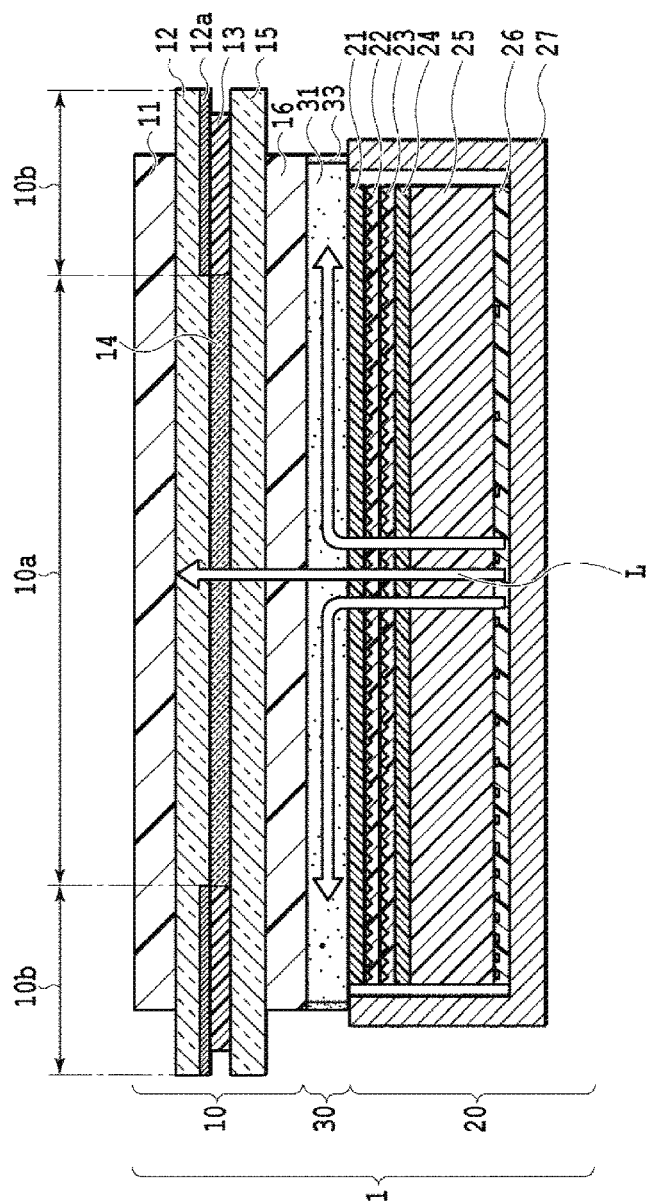
FIG. 10 is a cross-sectional view of an example of a configuration of an image display device according to Embodiment 2 of the present invention.

FIG. 10 is a cross-sectional view of an example of a configuration of an image display device according to Embodiment 2 of the present invention. The image display unit 10 and light source unit 20 of the image display device 1 are the same as the respective elements described with FIG. 5, and thus an explanation here will be omitted.

Similar to Embodiment 1, the bonding unit 30 is an OCA that attaches the light-receiving surface (rear polarizing plate 16) of the image display unit 10 to the light-exiting surface (top diffusion sheet 21) of the light source unit 20.

The bonding unit 30 includes a transmissive section 31 where the light L emitted from the light source unit 20 passes through, and a reflective section 33 that reflects the light L emitted from the light source unit 20. The transmissive section 31 is disposed in the center of the bonding unit 30, and the reflective section 33 is disposed on the outer edges of the bonding unit 30. The reflective section 33 is one form one of the peripheral section of the bonding unit 30.

The transmissive section 31 allows light L emitted from the light source unit 20 to pass through the image display unit 10. The reflective section 33 reflects light that has been emitted from the side faces of the bonding unit 30 among the light L emitted from the light source unit 20. When the bonding unit 30 is viewed from the display surface, the reflective section 33 is on the four sides around the transmissive section 31. The reflective section 33 can also be said to be a reflective film that covers all side faces of the sheet-like transmissive section 31. The transmissive section 31 and reflective section 33 each have adhesive properties and function to attach the image display unit 10 and light source unit 20 together.

The outer edges of the bonding unit 30 are colored silver, and the colored portions form the reflective section 33. The width dimensions of the colored portions are assumed to be 0.02 mm, but may be adjusted via microfabrication techniques and/or by adjusting the reflectance. Furthermore, the color of the reflective section 33 is not limited to silver and may be replaced by a color that reflects white color light, for example. The coloring method is assumed to color the area of the reflective section 33 after the OCA is processed into a sheet-like shape.

The areas of the bonding unit 30 other than the reflective section 33 form the transmissive section 31, which allows light L emitted from the light source unit 20 to pass.

Figure 7:
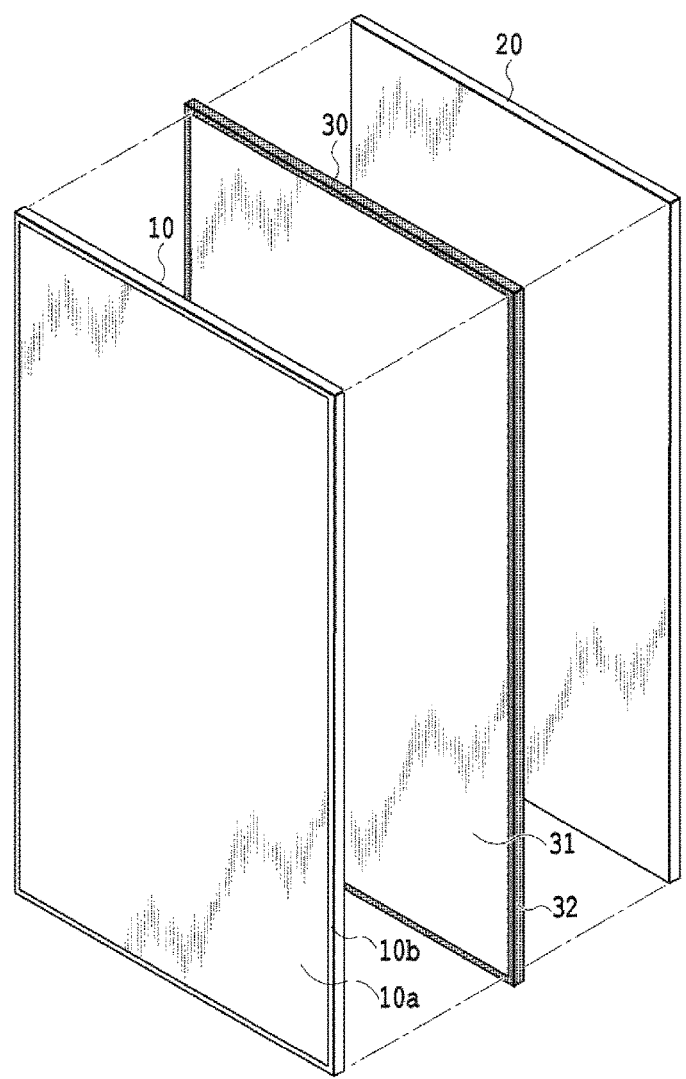
FIG. 7 is a perspective view of an example in which a liquid crystal display section and a light source unit have been attached together via a bonding unit in Embodiment 1 of the present invention.

The bond of the image display unit 10 to the light source unit 20 in Embodiment 2 is the same configuration described with FIGS. 7 and 8. Namely, the transmissive section 31 is disposed such that the image display area 10a is positioned in front relative to the display surface of the image display device 1. Meanwhile, the reflective section 33 is disposed relative to the display surface of the image display device 1 so as to overlap the non-image display area 10b. The width of the reflective section 33 is less than or equal to the width of the non-image display area 10b. This configuration allows the reflective section 33 to be imperceptible to the viewer. Hereinafter, the width of the reflective section 33 means the width parallel to the display surface of the image display device 1 from the edge of the reflective section 33 toward the center direction of the image display device 1.

Embodiment 2 of the present invention was described above, but Embodiment 2 has similar advantages to Embodiment 1. Furthermore, the reflective section 33 reflects light that leaks from the side faces of the bonding unit 30, which makes it possible to re-use the light that leaks.

In Embodiment 2, an example was shown in which the reflective section 33 was colored with a color that has reflective properties, but the reflective section is not limited to such a configuration. The reflective section 33 may be constituted by an optical sheet having reflective properties such as a white acrylic-based optical sheet of a different material from the transmissive section 31, for example. In such a case, the optical sheet may be attached to the end face (side face) of the transmissive section 31.

The width dimension of the optical sheet described above if this configuration is adopted is assumed to be 0.5 mm but may be adjusted in consideration of cutting and/or adhesive technology. Furthermore, the reflectance of the optical sheet is preferably at least 80%.

Moreover, the reflective section 33 may be formed by coloring the end face of the transmissive section 31 with an ink having reflective properties such as a silver or white ink. If adopting a configuration that is colored with this ink and that uses the optical sheet described above, the reflective section 33 need not have adhesive properties, but rather the image display unit 10 and light source unit 20 may be attached together by only the transmissive section 31. Even with this configuration, the majority of the bonding unit 30 is formed by the transmissive section 31, and thus it is possible to sufficiently maintain the adhesive strength between the image display unit 10 and the light source unit 20.

Embodiment 3

Figure 11:
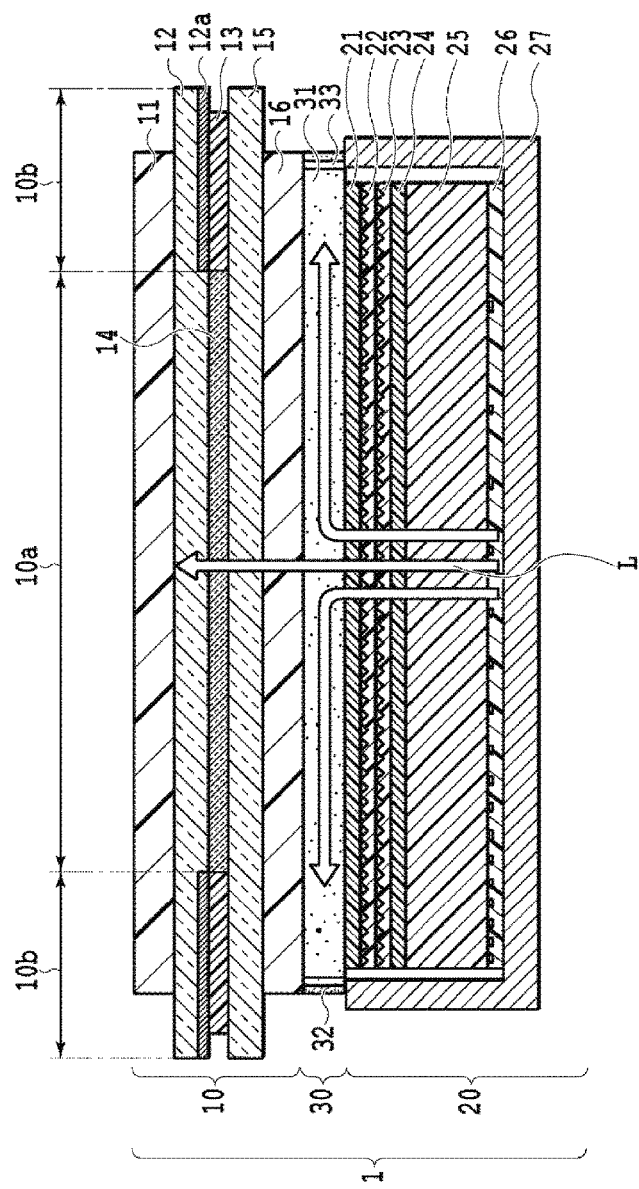
FIG. 11 is a cross-sectional view of an example of a configuration of an image display device according to Embodiment 3 of the present invention.

FIG. 11 is a cross-sectional view of an example of a configuration of an image display device according to Embodiment 3 of the present invention. The image display unit 10 and light source unit 20 of the image display device 1 are the same as the respective elements described with FIG. 5, and thus an explanation here will be omitted.

Similar to Embodiment 1, the bonding unit 30 is an OCA that attaches the light-receiving surface (rear polarizing plate 16) of the image display unit 10 to the light-exiting surface (top diffusion sheet 21) of the light source unit 20.

The bonding unit 30 includes the transmissive section 31 where the light L emitted from the light source unit 20 passes through, the light-blocking section 32 that blocks the light L emitted from the light source unit 20, and the reflective section 33 that reflects the light L emitted from the light source unit 20. The transmissive section 31 is disposed in the center of the bonding unit 30, the reflective section 33 is disposed on the outer edges of the transmissive section 31, and the light-blocking section 32 is disposed on the outer edges of the reflective section 33. In other words, the reflective section 33 is disposed between the transmissive section 31 and the light-blocking section 32. The light-blocking section 32 and reflective section 33 are one form of the peripheral section of the bonding unit 30.

The transmissive section 31 allows light L emitted from the light source unit 20 to pass through the image display unit 10. The reflective section 33 reflects light that has been emitted from the side faces of the bonding unit 30 among the light L emitted from the light source unit 20. The light-blocking section 32 blocks the portion of light L that has passed through the reflective section 33. When the bonding unit 30 is viewed from the display surface, the reflective section 33 and the light-blocking section 32 are on the four sides around the transmissive section 31. The reflective section 33 can also be said to be a reflective film that covers all side faces of the sheet-like transmissive section 31. Furthermore, the light-blocking section 32 can also be said to be a light-blocking film that covers all side faces of the reflective section 33. The transmissive section 31, reflective section 33, and light-blocking section 32 each have adhesive properties and function to attach the image display unit 10 and light source unit 20 together.

Next, a detailed example of the bonding unit 30 of Embodiment 3 of the present invention will be described with reference to FIG. 12. As described above, the bonding unit 30 is constituted by the transmissive section 31, light-blocking section 32, and reflective section 33.

Figure 12:
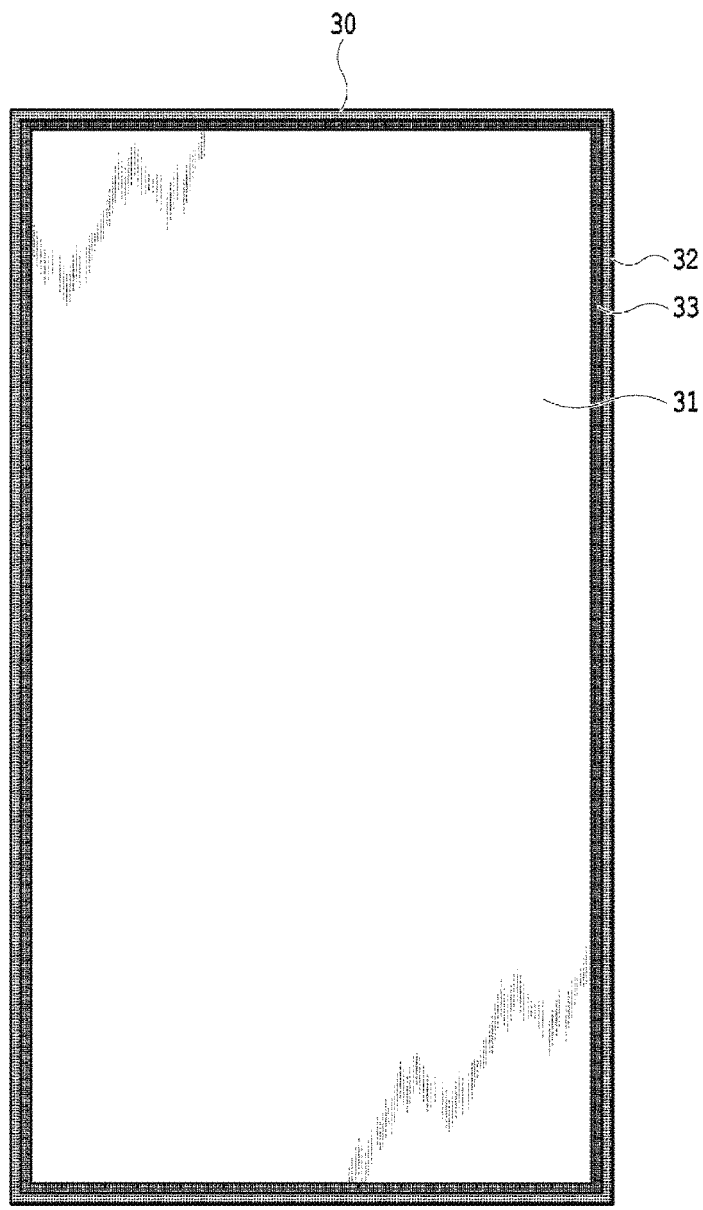
FIG. 12 is a view of an example of a detailed configuration of a bonding unit according to Embodiment 3 of the present invention.

As shown in FIG. 12, the reflective section 33 is positioned on the outer edges of the transmissive section 31. Furthermore, the light-blocking section 32 is positioned on the further outer edges of the reflective section 33. In other words, the reflective section 33 is disposed between the transmissive section 31 and the light-blocking section 32.

The light-blocking section 32 is colored black (or another color having light-blocking properties, such as gray). The reflective section 33 is colored silver (or another color having reflective properties, such as white). The width dimensions of the respective colored portions of the light-blocking section 32 and reflective section 33 in the end direction of the bonding unit 30 are assumed to be 0.02 mm, but may be adjusted via microfabrication techniques, by adjusting the light-blocking rate, and/or by adjusting the reflectance. The coloring method is assumed to color the areas of the light-blocking section 32 and reflective section 33 after the OCA is processed into a sheet-like shape.

The areas of the bonding unit 30 other than the light-blocking section 32 and reflective section 33 form the transmissive section 31, which allows light emitted from the light source unit 20 to pass.

The bond of the image display unit 10 to the light source unit 20 in Embodiment 3 is the same configuration described with FIGS. 7 and 8. Namely, the transmissive section 31 is disposed such that the image display area 10a is positioned in front relative to the display surface of the image display device 1. Meanwhile, the light-blocking section 32 and reflective section 33 are disposed relative to the display surface of the image display device 1 so as to overlap the non-image display area 10b. The total width from adding the width of the light-blocking section 32 and the width of the reflective section 33 is less than or equal to the width of the non-image display area 10b. This configuration allows the light-blocking section 32 and reflective section 33 to be imperceptible to the viewer.

Embodiment 3 of the present invention was described above, but Embodiment 3 has similar advantages to Embodiment 1 and Embodiment 2.

Furthermore, the light-blocking section 32 blocks the light that has leaked from the reflective section 33, thus making it possible to reliably prevent light leakage from the bonding unit 30.

In Embodiment 3, an example was shown in which the light-blocking section 32 and reflective section 33 were colored, but the present invention is not limited to such a configuration. The reflective section 33 may be constituted by an optical sheet having reflective properties such as an acrylic-based optical sheet of a different material from the transmissive section 31, for example. In such a case, the reflective optical sheet is attached to the end face (side face) of the transmissive section 31. Moreover, the light-blocking section 32 may be constituted by an optical sheet having light-blocking properties such as a black acrylic-based optical sheet of a different material from the transmissive section 31 and/or the reflective section 33, for example. In such a case, the light-blocking optical sheet is attached to the end face (side face) of the reflective section 33. The dimensions and considerations when adopting these configurations is the same as those described in Embodiment 1 and Embodiment 2.

In addition, the reflective section 33 may be formed by coloring the end face of the transmissive section 31 with an ink having reflective properties such as a silver or white ink. The light-blocking section 32 may also be formed by coloring the end face of the reflective section 33 with the ink described above or the like having light-blocking properties such as a black or gray ink. If adopting a configuration that is colored with this ink and that uses the optical sheet described above, the light-blocking section 32 and reflective section 33 need not have adhesive properties, but rather the image display unit 10 and light source unit 20 may be attached together by only the transmissive section 31. Even with this configuration, the majority of the bonding unit 30 is formed by the transmissive section 31, and thus it is possible to sufficiently maintain the adhesive strength between the image display unit 10 and the light source unit 20.

Embodiment 4

Figure 13:
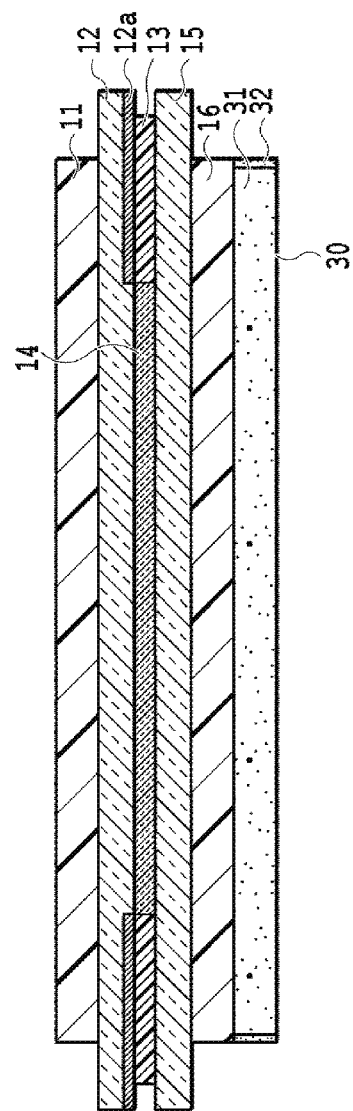
FIG. 13 is a view of an example of a detailed configuration of a bonding unit according to Embodiment 4 of the present invention.

FIG. 13 is a cross-sectional view of an example of a configuration of a portion of an image display device according to Embodiment 4 of the present invention. The image display unit 10, light source unit 20, and bonding unit 30 of the image display device 1 are the same as the respective elements described with FIG. 5, and thus an explanation here will be omitted.

In Embodiments 1 to 3 of the present invention, an example was described in which a sheet-like OCA was used as the bonding unit 30. In comparison, in Embodiment 4, an OCA is layered in advance on the light-entering surface (rear polarizing plate 16) of the image display unit 10. As in Embodiment 1, the periphery of the OCA is colored black.

Embodiment 4 has different characteristics in the process of manufacturing the image display device 1. The steps for assembling the respective elements of the image display device described in Embodiment 1 of the present invention, or namely, an example of the module manufacturing process of the image display device of Embodiment 1, will be described with reference to the flow chart in FIG. 14.

First, in step S1401, an adhesive material or the like is used to attach the front polarizing plate 11 to the opposing surface of the color filter substrate 12. Furthermore, the rear polarizing plate 16 is attached to the opposing surface of the array substrate 15.

Next, a flexible printed circuit (FPC) board having leads formed on a base material is crimp connected onto wiring on the array substrate 15 via an anisotropic conductive film (ACF) or the like (step S1402).

Next, the bonding unit 30, which has been cut into a prescribed external shape and the outer edges of which have been colored (black and/or silver), is attached to the light-entering surface (rear polarizing plate 16) of the image display unit 10 (step S1403).

Finally, the light-entering surface of the image display unit 10 and the light-exiting surface of the light source unit 20 are attached via the bonding unit 30 (step S1404).

Figure 14:
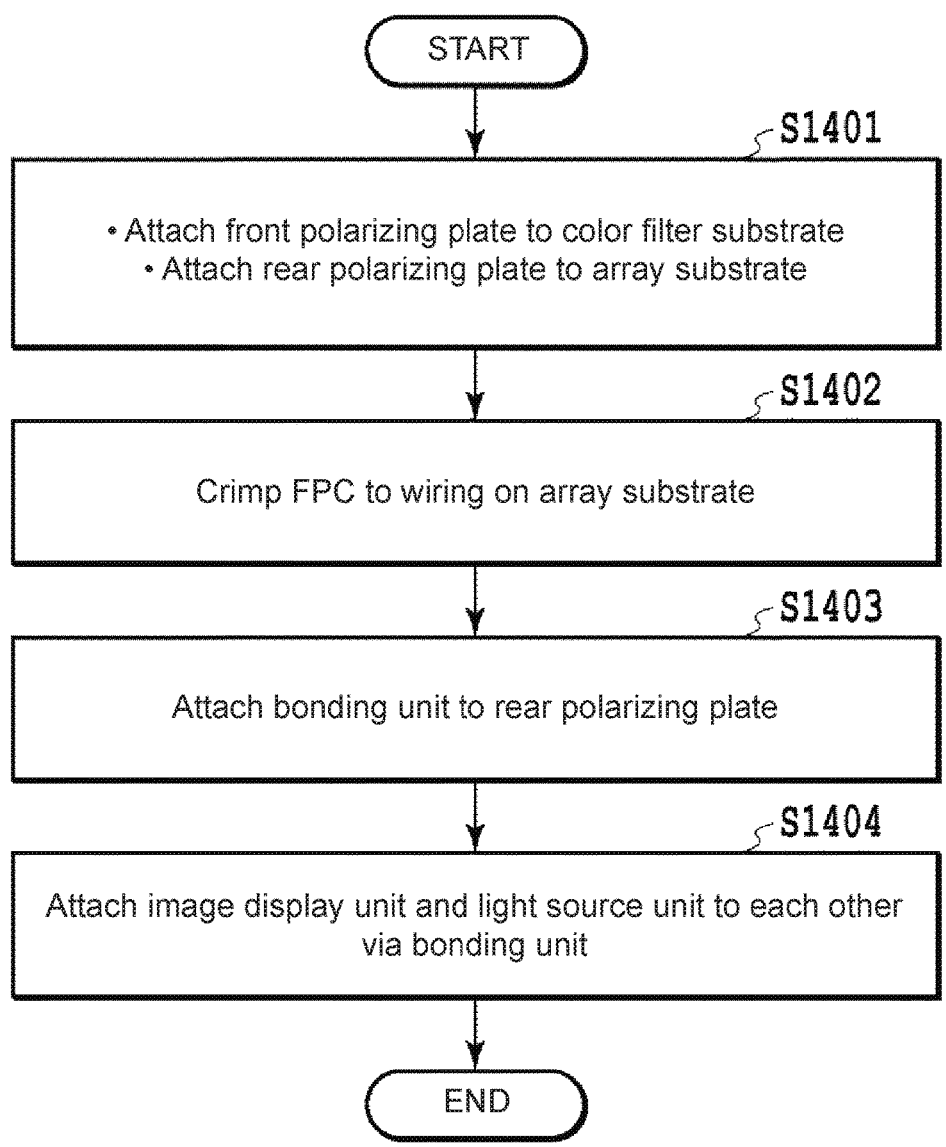
FIG. 14 is a flow chart of the steps to assemble the image display device according to Embodiment 1 of the present invention.

Compared to the steps described in FIG. 14, in Embodiment 4, the OCA is layered onto the light-entering surface (rear polarizing plate 16) of the image display unit 10 in advance; therefore, it is possible to emit step S1403 in FIG. 14.

Figure 15:
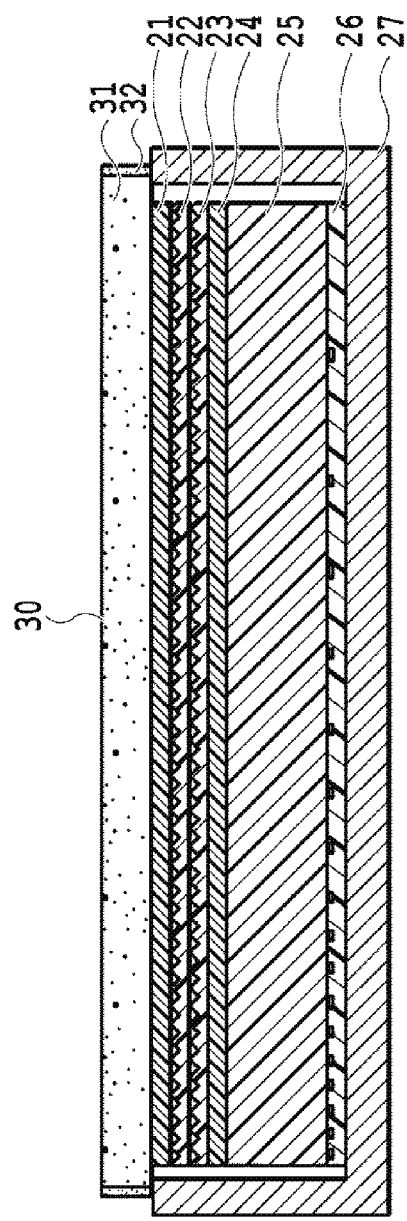
FIG. 15 is a view of another example of a detailed configuration of a bonding unit according to Embodiment 4 of the present invention.

Moreover, as an application of Embodiment 4, layering the OCA on the light-exiting surface (top diffusion sheet 21) of the light source unit 20 in advance, as shown in FIG. 15, can also make it possible to similarly omit step S1403 in FIG. 14.

An image display device of the present invention was described above, but the present invention is not limited to the embodiments above, and various modifications can be made without departing from the spirit of the present invention.

DESCRIPTION OF REFERENCE CHARACTERS

1 image display device
10 image display unit
10*a* image display area
10*b* non-image display area
10*b*-1 non-image display area
10*b*-2 non-image display area
11 front polarizing plate
12 color filter substrate
12*a* light-blocking layer
13 sealing member
14 liquid crystal layer
15 array substrate
16 rear polarizing plate
20 light source unit
21 top diffusion sheet
22 top lens sheet
23 bottom lens sheet
24 bottom diffusion sheet
25 light guide plate
26 reflective sheet
27 case
30 bonding unit
31 transmissive section
32 light-blocking section
32*a* light-blocking section
32*b* light-blocking section
33 reflective section
100 liquid crystal panel
100*a* image display area
100*b* non-image display area
101 front polarizing plate
102 color filter substrate
102*a* light-blocking layer
103 sealing member
104 liquid crystal layer
105 array substrate
106 rear polarizing plate
200 backlight unit
300 rim tape
300*a* base material section
300*b* adhesive section
L light
S line of sight

What is claimed is:

1. An image display device, including:
an image display unit;
a light source unit illuminating the image display unit with light; and
a bonding unit bonding the image display unit and the light source unit to each other, the bonding unit having adhesive properties, attaching the image display unit to the light source unit, and including a transmissive section that transmits the light emitted from the light source unit to the image display unit, and a peripheral section disposed on outer edges of the transmissive section that does not transmit the light emitted from the light source unit,
wherein the peripheral section of the bonding unit includes a light-blocking section blocking the light emitted from the light source unit and a reflective section reflecting the light emitted from the light source unit,
wherein the light-blocking section is colored a color having light-blocking properties, and the reflective section is colored a color having reflective properties, and
wherein the reflective section is disposed on the outer edges of the transmissive section, and the light-blocking section is disposed on outer edges of the reflective section.

2. The image display device according to claim 1, wherein the bonding unit is an adhesive film having a sheet shape.

3. The image display device according to claim 1, wherein the image display unit has an image display area and a non-image display area, and
wherein the peripheral section of the bonding unit is disposed so as to overlap the non-image display area.

* * * * *